United States Patent
Frei

(10) Patent No.: US 7,746,519 B2
(45) Date of Patent: Jun. 29, 2010

(54) METHOD AND DEVICE FOR SCANNING IMAGES

(75) Inventor: Bernhard Frei, Constance (DE)

(73) Assignee: Oce Printing Systems GmbH, Poing (DE)

(*) Notice: Subject to any disclaimer, the term of this patent is extended or adjusted under 35 U.S.C. 154(b) by 8 days.

(21) Appl. No.: 12/279,360

(22) PCT Filed: Dec. 1, 2006

(86) PCT No.: PCT/EP2006/069197

§ 371 (c)(1),
(2), (4) Date: Oct. 13, 2008

(87) PCT Pub. No.: WO2007/093241

PCT Pub. Date: Aug. 23, 2007

(65) Prior Publication Data

US 2009/0153924 A1 Jun. 18, 2009

(30) Foreign Application Priority Data

Feb. 14, 2006 (DE) .................... 10 2006 006 835

(51) Int. Cl.
*H04N 1/04* (2006.01)
(52) U.S. Cl. .............. 358/474; 358/1.9; 358/505; 358/518; 358/3.26; 382/164; 382/274; 382/275; 348/245; 348/243; 250/208.1
(58) Field of Classification Search ............ 358/1.9, 358/501, 505, 512, 514, 515, 516, 518, 525, 358/530, 3.26; 382/164, 167, 274, 275, 257, 382/286, 293, 300; 348/245, 243, 241; 250/208.1
See application file for complete search history.

(56) References Cited

U.S. PATENT DOCUMENTS

| 4,725,881 A | | 2/1988 | Buchwald | |
|---|---|---|---|---|
| 5,085,506 A | * | 2/1992 | Kahn et al. | 353/122 |
| 5,198,897 A | * | 3/1993 | Baldwin | 348/104 |
| 5,315,412 A | * | 5/1994 | Mihara et al. | 358/512 |
| 5,321,529 A | * | 6/1994 | Funada | 358/500 |
| 5,353,045 A | | 10/1994 | Sako | |

(Continued)

FOREIGN PATENT DOCUMENTS

DE 34 18 787 11/1985

(Continued)

OTHER PUBLICATIONS

Japanese Office Action dated Sep. 24, 2008.

*Primary Examiner*—Negussie Worku
(74) *Attorney, Agent, or Firm*—Schiff Hardin LLP

(57) ABSTRACT

In a method or system for scanning a source image, the source image is scanned with a sensor that comprises multiple line arrays designed to detect a specific color such that a color separation of the source image to be scanned is generated by each line array. The color separations represent the source image in the form of pixels. The pixels of the different separations of the source image are at least partially offset relative to one another. The pixels of the color separations are separately filtered with multiple FIR sub-filters. The filtered pixels of the source image of the multiple color separations are summed into pixels of a target image.

9 Claims, 3 Drawing Sheets

U.S. PATENT DOCUMENTS

| | | | | |
|---|---|---|---|---|
| 5,361,145 | A | 11/1994 | Hasegawa | |
| 5,452,112 | A * | 9/1995 | Wan et al. | 358/504 |
| 5,513,007 | A * | 4/1996 | Ito et al. | 358/296 |
| 5,587,814 | A * | 12/1996 | Mihara et al. | 358/512 |
| 5,859,712 | A * | 1/1999 | Kim | 358/504 |
| 5,892,551 | A * | 4/1999 | Uematsu | 348/447 |
| 5,923,447 | A * | 7/1999 | Yamada | 358/523 |
| 6,536,904 | B2 * | 3/2003 | Kunzman | 353/31 |
| 6,753,914 | B1 * | 6/2004 | Frost | 348/246 |
| 6,819,799 | B1 * | 11/2004 | Sakaguchi | 382/235 |
| 7,535,600 | B2 * | 5/2009 | Choon | 358/474 |
| 2003/0222987 | A1 | 12/2003 | Karazuba | |
| 2005/0018903 | A1 * | 1/2005 | Miyagi et al. | 382/167 |
| 2006/0245014 | A1 * | 11/2006 | Haneda | 358/512 |
| 2009/0079855 | A1 * | 3/2009 | Ito et al. | 348/265 |

FOREIGN PATENT DOCUMENTS

| | | |
|---|---|---|
| DE | 198 35 348 | 2/2000 |
| DE | 10 2004 024 855 | 12/2005 |
| EP | 0 729 278 | 8/1996 |
| EP | 1 173 029 | 1/2002 |
| EP | 1 569 168 | 8/2005 |
| GB | 2 308 936 | 7/1997 |
| JP | 54 174147 | 5/1953 |
| JP | 2005 186676 A | 7/2005 |
| JP | 2005 263038 A | 9/2005 |
| WO | WO 01/99431 | 12/2001 |
| WO | WO 2005/114573 | 12/2005 |
| WO | WO 2007/062679 | 6/2007 |

* cited by examiner

METHOD AND DEVICE FOR SCANNING IMAGES

BACKGROUND

The present preferred embodiment concerns a method and a device for scanning images, wherein a source image is scanned by means of multiple color sensor elements. The source image can be both a black-and-white image and a color image. The target image generated by the scanning is a black-and-white image.

It is known that black-and-white images can be scanned with a color scanner that possesses multiple color sensor elements. The source image is hereby typically scanned in the same manner as a color image, and the pseudo-color image so obtained is correspondingly corrected so that the grey levels in the target image coincide optimally well with the corresponding brightness values in the source image. In these known methods, black-and-white images are scanned with the same speed and with the same resolution as color images.

A method for scanning images by means of a device that possesses multiple color sensors in order to generate a target image as a black-and-white image emerges from the European Patent Application PCT/EP2005/012882 (not yet published). In this device, the scanning speed and/or the resolution are increased relative to conventional methods. The fundamental difference of this method relative to the conventional methods lies in that individual image points (pixels) of the source image are not respectively scanned by all color sensor elements, but rather only by a respective single color sensor element, whereby it is possible that the multiple color spin echo sequence simultaneously scan multiple pixels. The scanning speed is hereby increased or a significantly higher resolution is achieved given the same scanning speed as in conventional scanning devices.

Since the individual color sensor elements generate different signals for the same brightness values, the signals are correspondingly corrected. Upon scanning a color source image, color regions of the source image are registered with differing strength with the different color sensor elements. A red, green and blue color sensor element is normally provided. A green color region in the source image is detected well by the green color sensor element, in contrast to which the blue and red color sensor elements emit barely any signal for a green color region. Flaws (which are designated as frequency artifacts) hereby arise in the target image of a color source image. Such frequency artifacts can be detected and corrected with corresponding filters.

In this method, the pixels acquired with the different color sensor elements are initially sorted so that they are arranged in an arrangement corresponding to the source image. This is necessary since the different sensor elements are arranged at a distance from one another, such that here a data stream in which the values of the individual pixels are arranged offset relative to one another from data stream to data stream arises for each sensor element.

A method for interpolation and correction of a digital image emerges from the international Patent Application WO 2005/114573 A1 corresponding to pending U.S. application Ser. No. 11/579,293, wherein a source image is mapped to a target image with a FIR filter. The FIR filter comprises multiple filter coefficients that contain both the information regarding interpolation and regarding correction of the image. Both the interpolation and the correction of the image are hereby executed in a single step.

SUMMARY

It is an object to achieve a method and a device to scan an image in order to generate a target image in black-and-white representation, wherein a high scan rate is possible at a high resolution and at the same time the target image can be generated quickly, and essentially the same hardware can be used as in the generation of a target image in color representation.

In a method or system for scanning a source image, the source image is scanned with a sensor that comprises multiple line arrays designed to detect a specific color such that a color separation of the source image to be scanned is generated by each line array. The color separations represent the source image in the form of pixels. The pixels of the different separations of the source image are at least partially offset relative to one another. The pixels of the color separations are separately filtered with multiple FIR sub-filters. The filtered pixels of the source image of the multiple color separations are summed into pixels of a target image.

DESCRIPTION OF THE PREFERRED EMBODIMENT

Figure 1:
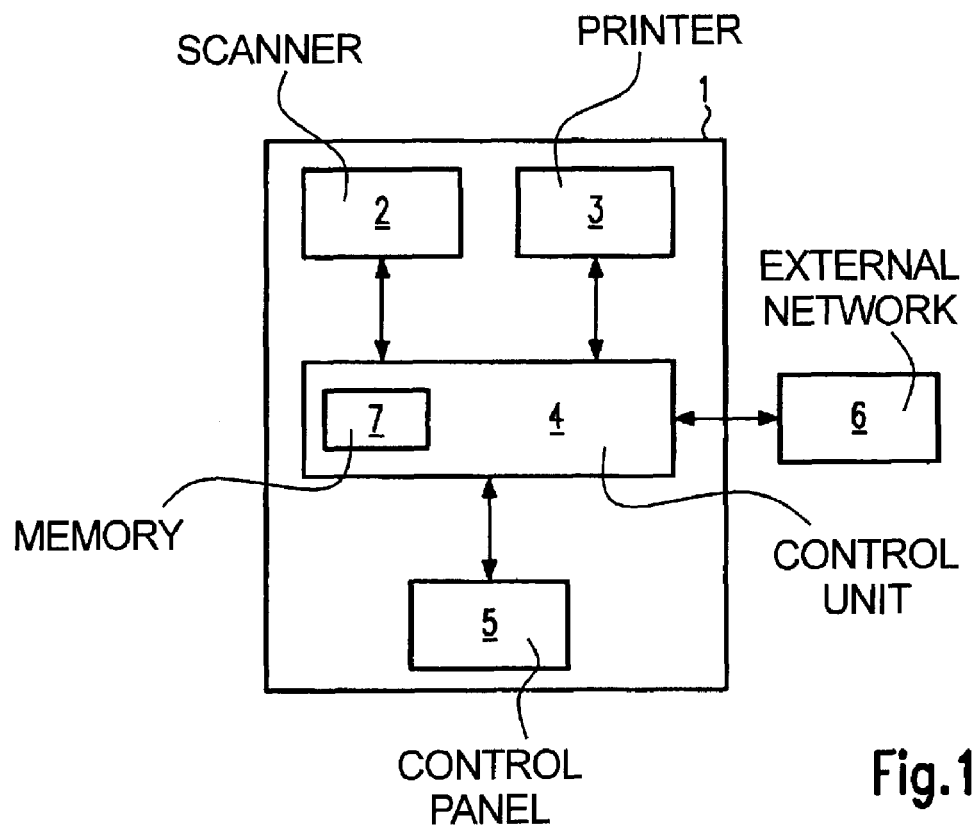
FIG. 1 shows parts of a copier, including a scanner and a printer in a block diagram.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

The method according to the preferred embodiment for scanning an image comprises the following steps:

scanning a source image with a sensor that comprises multiple line arrays that are respectively designed to detect a specific color, such that a color separation of a source image to be scanned is generated by each line array, which color separations represent the source image in the form of pixels, wherein the pixels of the different color separations of a specific source image are somewhat offset relative to one another, separate filtering of the color separations with multiple FIR sub-filters, and summation of the filtered pixels of the source image of the multiple color separations into pixels of a target image.

With the method according to the preferred embodiment, the sub-filters are directly applied to the individual color separations without the color separations having to be mixed into a standardized data unit. A corresponding sorting process is spared by this since the correct pixels of the color separations are selected via the application of the sub-filters. Significantly less computing power is additionally required upon application of three small sub-filters than given application of a significantly larger total filter. The automatic execution of the method according to the preferred embodiment is hereby significantly accelerated.

An interpolation of pixels of the source image to the pixels of the target image is also advantageously executed upon filtering.

Furthermore, it is possible to execute a correction of the scanned source image upon filtering. For example, the different sensitivity of the line arrays for grey levels can hereby be corrected. Furthermore, a correction of the frequency response of the scanned source image can be executed.

The device according to the preferred embodiment for scanning an image comprises
- a sensor that possesses multiple line arrays for scanning a source image that are respectively designed to detect a specific color, such that a color separation of a source image to be scanned is generated by each line array; these color separations represent the source image in the form of pixels, wherein the pixels of the color separations of a specific source image are offset somewhat relative to one another, and
- a control unit that is designed such that a FIR sub-filter is respectively applied to the color separations in order to map the pixels of the multiple color separations to a single target image.

With the method according to the preferred embodiment and the device according to the preferred embodiment, the mapping of the pixels of the multiple color separations to a target image is as an interpolation over a longitudinal region that corresponds to two adjacent pixels in a color separation. Due to the offset of the color separations, upon superimposition of the color separations in this longitudinal region a pixel of the different color separations would respectively be arranged with the same respective separation relative to one another. It is thus interpolated via these color separations, wherein an additional interpolation without an additional method step is possible. Given this additional interpolation, pixels that are arranged between the pixels of the color separations can be interpolated.

The preferred embodiment is subsequently explained in detail by way of example. The exemplary embodiment is schematically presented in the drawings.

A copier with a scanner 2 and a printer 3 is shown in FIG. 1. A control unit 4 controls the scanner 2 and the printer 3 and is connected with a control panel 5 and an external network 6.

If a source image is scanned by the scanner 2, the signals hereby generated are converted into digital data and are stored in a memory 6 in the control unit 4. The image data stored in the memory 7 can be printed out directly at the printer 3 by means of the control unit 4 or be sent via the external network 6.

Figure 2:
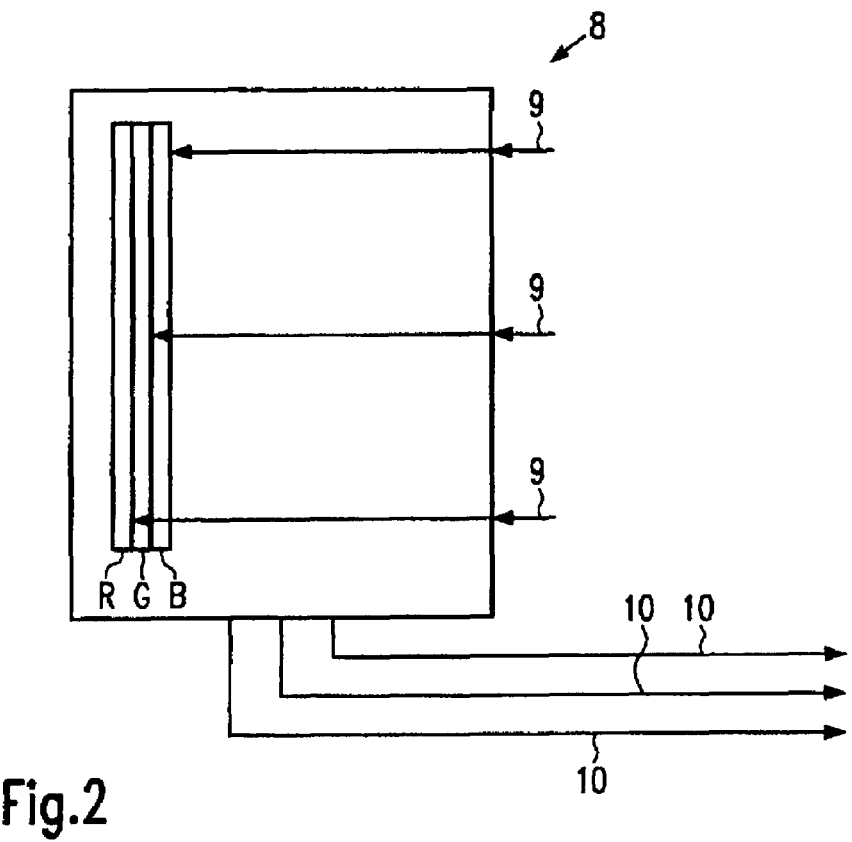
FIG. 2 illustrates an optical sensor of the scanner.

The scanner 2 possesses an optical sensor 8 (FIG. 2). The sensor 8 is provided with three parallel CCD line arrays that respectively form a color sensor element for the colors red R, green G and blue B. For this the CCD line arrays are respectively provided with a red, green or blue color filter.

In FIG. 2 the CCD line arrays are shown arranged directly adjoining one another. In practice, the individual CCD line arrays respectively possess a determined separation from one another for production technology reasons. The individual CCD line arrays are activated by means of clock signals that are supplied via corresponding clock signal lines 9, wherein one pixel is read out per clock pulse. The signals read out by the CCD line arrays are output via a respective signal line 10.

These sensors 8 thus comprise three CCD line arrays that respectively represent a color sensor element and generate a respective, separate data stream for red, green and blue pixels.

The entirety of the data of an image of one of the three data streams is designated as a color separation. After the complete scanning of a source image, three color separations thus exist for the colors red, green and blue in the present exemplary embodiment. The color separations represent a coordinate system in which the individual pixels are arranged. Due to the spatial offset of the color sensor elements R, G, B, the color separations are offset somewhat relative to one another in the coordinate systems. The offset between two color separations depends on the scan speed with which the sensor 8 is moved relative to the source image.

In the present exemplary embodiment, the offset between the color separations of two adjacent color sensor elements is 15⅓ pixels. The offset between the color separations for the colors red and blue is thus 30⅔ pixels.

Figure 3:
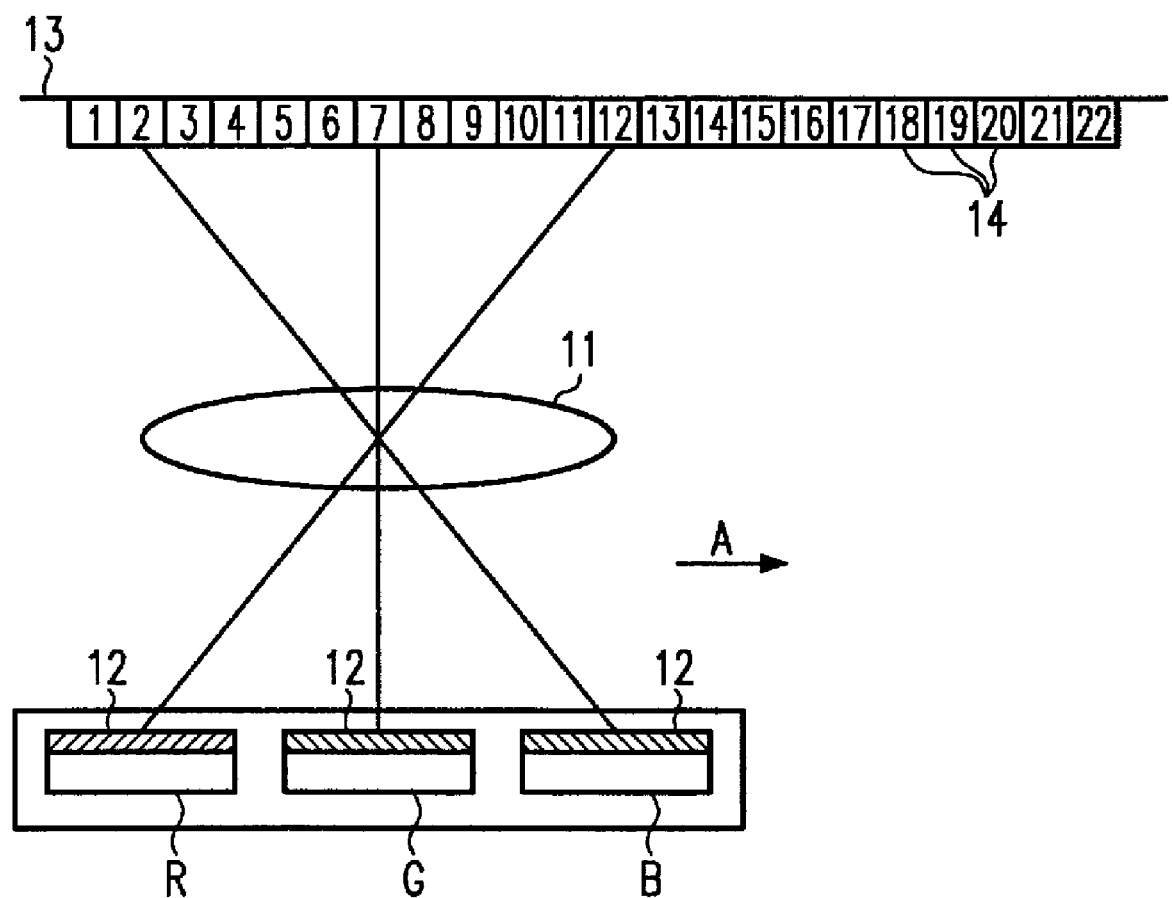
FIG. 3 shows a sensor unit with three color sensor elements.

The sensor 8 is schematically shown in FIG. 3. It comprises an objective 11, the three color sensor elements R, G, B (that are respectively provided with a color filter 12) and a source image 13 on which multiple lines of pixels 14 are schematically shown and sequentially numbered with the numbers 1 to 22. When the individual color sensor elements R, G, B are simultaneously activated to detect a pixel, the offset between two color separations of adjacent color sensor elements is then five pixels in the embodiment shown in FIG. 3; due to a temporally offset activation of the individual color sensor elements and corresponding adjustment of the relative speed (arrow A in FIG. 3), integer multiples can also not be achieved.

The signals acquired with the sensor are corrected. This occurs by means of a filter.

The application of a filter to the pixels detected with the sensor is normally executed as a vector product, wherein the filter is a vector with multiple filter coefficients a1, a2, ..., an that is multiplied with a vector consisting of the values of pixels detected by the sensor. These pixels to which the filter is applied are arranged in parallel in the source image. The application of a filter to pixels is described in detail in WO 2005/114573 A1 corresponding to U.S. application Ser. No. 11/579,293, the entire content of which is therefore referenced and incorporated into the present application.

In order to apply the filter to the pixels in a conventional manner, the three color separations generated by the three color sensor elements would have to be merged into a single image in which the corresponding pixels are sorted according to their position in the source image. The following sequence of pixels would thus result given the sensor 8 shown in FIGS. 2 and 3:

r0 g0 b0 r1 g1 b1 r2 g2 b2 ..., wherein the letters r, g, b identify the color sensor element with which the respective pixel has been detected, and the character attached to this designates the position of the respective pixel in the line of the image. However, such a sorting of the pixels is complicated, in particular when the source images should be scanned with different scan rates and different resolution with the scanner, since then the sorting algorithm must be respectively adapted to the different resolution and scan rate. Such a sorting incurs a plurality of storage processes that significantly engage the processor (CPU) of the control unit without special hardware (ASICs or FPGA).

The underlying principle of the present preferred embodiment is that the three data streams of the three color channels of the three color sensor elements are not merged before the filtering, but rather that the filter is designed so that the corresponding pixels are first selected from the three data streams or three color separations in the filter process. The selection of the pixels of the three color separations and the correction of the signals (acquired with the sensor 8) of the pixels hereby occur simultaneously in a single work step. The sorting process is spared, whereby the source image can be generated in real time.

For a simple application of the filter, only the coordinate systems of the three color separations are uniformly aligned relative to one another. In the exemplary embodiment explained above, in which the color separations are respectively offset by 15⅓ pixels or 30⅔ pixels, the coordinate system of the green color separation is initially modified by 15 pixels relative to that of the red, and the coordinate system of the blue color separation is modified by 30 pixels in the direction towards the red color separation. For this, only the parameters of the coordinate axes must be correspondingly modified. This adaptation can occur very quickly. This adaptation or, respectively, the alignment of the coordinate systems is executed only with regard to integer pixels. Offsets by fractions of the separation of two adjacent pixels are hereby not corrected.

The invention is subsequently explained using an example with a FIR filter that is divided up into three sub-filters that are respectively applied to a color separation.

Furthermore, in the design of the filter it is to be taken into account that an interpolation is to be implemented during the filter process. Since the pixels in the target image are not always arranged in the same raster as the pixels in the source image, a specific pixel of the source image cannot always be mapped to a specific pixel of the target image. Rather, a theoretical pixel of the source image must be mapped to a pixel of the target image, wherein the theoretical pixel of the source image can lie between two actual detected pixels of the source image. In order to obtain this theoretical pixel, an interpolation is necessary. In the present exemplary embodiment, multiple sets of three sub-filters each are therefore generated with which a different interpolation step respectively occurs.

The conventional application of a filter with six filter coefficients a1, a2, ..., a6 to pixels in the source image is subsequently presented:

a1 r0
a2 b0
a3 g0
a4 r1
a5 b1
a6 g1
0. r2
0. b2
0. g2

The products a1 r0, a2 b0, ..., a6 g1 are added together and yield the grey value of a pixel in the target image that is arranged exactly at the position of a theoretical pixel in the source image between the pixels g0 and r1.

With the following filter, a theoretical pixel that is displaced by a distance of 1/11 in the direction of the pixel r1 relative to the center between the pixels g0 and r1 is mapped to a pixel in the corresponding position of the target image:

0.909091 a1 r0
(0.0909091 a1+0.909091 a2) b0
(0.0909091 a2+0.909091 a3) g0
(0.0909091 a3+0.909091 a4) r1
(0.0909091 a4+0.909091 a5) b1
(0.0909091 a5+0.909091 a6) g1
0.0909091 a6 r2
0. b2
0. g2

Given a further displacement of the theoretical pixel by 1/11 of the separation of two adjacent pixels in the source image, the following filter results:

0.818182 a1 r0
(0.181818 a1+0.818182 a2) b0
(0.181818 a2+0.818182 a3) g0
(0.181818 a3+0.818182 a4) r1
(0.181818 a4+0.818182 a5) b1
(0.181818 a5 +0.818182 a6) g1
0.181818 a6 r2
0. b2
0. g2

Corresponding filters are generated for the additional displacements of the theoretical pixel by a respective distance of 1/11 of the separation of two adjacent pixels of the source image. In the present exemplary embodiment, the bilinear interpolation method is applied. However, other interpolation methods are also sufficiently known.

Given a displacement of the theoretical pixel by an entire separation (11/11) of two adjacent pixels of the source image, the first filter results again, which now is applied to the series of pixels of the source image that begins with b0 and ends at r2:

0. r0
a1 b0
a2 g0
a3 r1
a4 b1
a5 g1
a6 r2
0. b2
0. g2

The following application of the filter to the pixels results given an additional offset by exactly a whole distance between two adjacent pixels of the source image:

0. r0
0. b0
a1 g0
a2 r1
a3 b1
a4 g1
a5 r2
a6 b2
0. g2

The complete sequence from r0 to g2 is respectively executed in the above depictions, wherein the pixels of the source image to which none of the filter coefficients a1 through a6 is applied are multiplied with the factor 0. These additional products with the factor 0 are without physical importance for the execution of the imaging of the pixels of the source image. However, they are important for the creation of the sub-filters.

In the generation of the sub-filters, filter application for each interpolation shift and for each color is assumed. In the present exemplary embodiment, there are in total eleven interpolation shifts for three colors, such that in total 33 such filter applications are to be generated. Given a different selection of interpolation steps (that is inherently arbitrary) or given a different sensor with a different number of color sensor elements, the number of filter applications is to be correspondingly modified.

The 33 sub-filters are designated with F1r, F1b, F1g, F2r, F2b, F2g, ..., F22r, F33b, F33g, wherein the number in this designation designates the interpolation step and the latter specifies the respective color to the color separation of which the filter is to be applied.

Three sub-filters are generated from each filter application in that the coefficients that are multiplied with the pixel of a specific color are associated with the sub-filter with the corresponding color. From the filter application without interpolation shift (listed above as first), the coefficients a1, a4, 0 are associated with the filter F1r. The following three sub-filters F1r, F1b, F1g thus result from the first filter application listed above:

$$F1r = \begin{pmatrix} a1 \\ a4 \\ 0 \end{pmatrix}$$

$$F1b = \begin{pmatrix} a2 \\ a5 \\ 0 \end{pmatrix}$$

$$F1g = \begin{pmatrix} a3 \\ a6 \\ 0 \end{pmatrix}$$

The filters for the first interpolation shift correspondingly read:

$$F2r = \begin{pmatrix} 0.909091a1 \\ 0.909091a3 + 0.909091a4 \\ 0.909091a6 \end{pmatrix}$$

$$F2b = \begin{pmatrix} 0.909091a1 + 0.909091a2 \\ 0.909091a4 + 0.909091a5 \\ 0 \end{pmatrix}$$

$$F2g = \begin{pmatrix} 0.909091a2 + 0.909091a3 \\ 0.909091a5 + 0.909091a6 \\ 0 \end{pmatrix}$$

The sub-filters for the eleventh shift accordingly read:

$$F11r = \begin{pmatrix} 0.909091a1 \\ 0.909091a3 + 0.909091a4 \\ 0.909091a6 \end{pmatrix}$$

$$F11b = \begin{pmatrix} 0.909091a1 + 0.909091a2 \\ 0.909091a4 + 0.909091a5 \\ 0 \end{pmatrix}$$

$$F11g = \begin{pmatrix} 0.909091a2 + 0.909091a3 \\ 0.909091a5 + 0.909091a6 \\ 0 \end{pmatrix}$$

$$F33r = \begin{pmatrix} 0.909091a1 \\ 0.909091a3 + 0.909091a4 \\ 0.909091a6 \end{pmatrix}$$

$$F33b = \begin{pmatrix} 0 \\ 0.909091a1 + 0.909091a2 \\ 0.909091a4 + 0.909091a5 \end{pmatrix}$$

$$F33g = \begin{pmatrix} 0.909091a1 \\ 0.909091a3 + 0.909091a4 \\ 0.909091a6 \end{pmatrix}$$

The generation of the sub-filters can accordingly be briefly summarized as:

The scalar products of a vector product of the vector of the filter with a vector comprising the corresponding pixels of the source image are generated, wherein the scalar products are generated for each application of the filter to each interpolation shift. These scalar products are respectively considered for a complete sequence of pixels that comprises multiple complete sets of pixels, wherein a set of pixels respectively possesses exactly one pixel of the different color types (r, b, g). The pixels that are multiplied with no filter coefficients are multiplied with 0. The sub-filters comprise as coefficients the factors of the scalar products of such a vector product that are multiplied with a respective pixel of a specific color. These factors are assumed in the same arrangement as in the vector product in the sub-filter. If corresponding sequences in the different color separations are now multiplied with the corresponding sub-filters (vector product) and if the values resulting from this are added, the grey tone for the corresponding pixel is obtained in the target image. The sub-filters can thus be directly applied to the individual color separations without mixing the color separations into a standardized data unit. On the one hand, the corresponding sorting process is spared by this. Additionally, significantly less computing power is required given application of three small sub-filters than given application of a significantly larger total filter. The automatic execution of the method according to the invention is hereby significantly accelerated.

Figure 4:
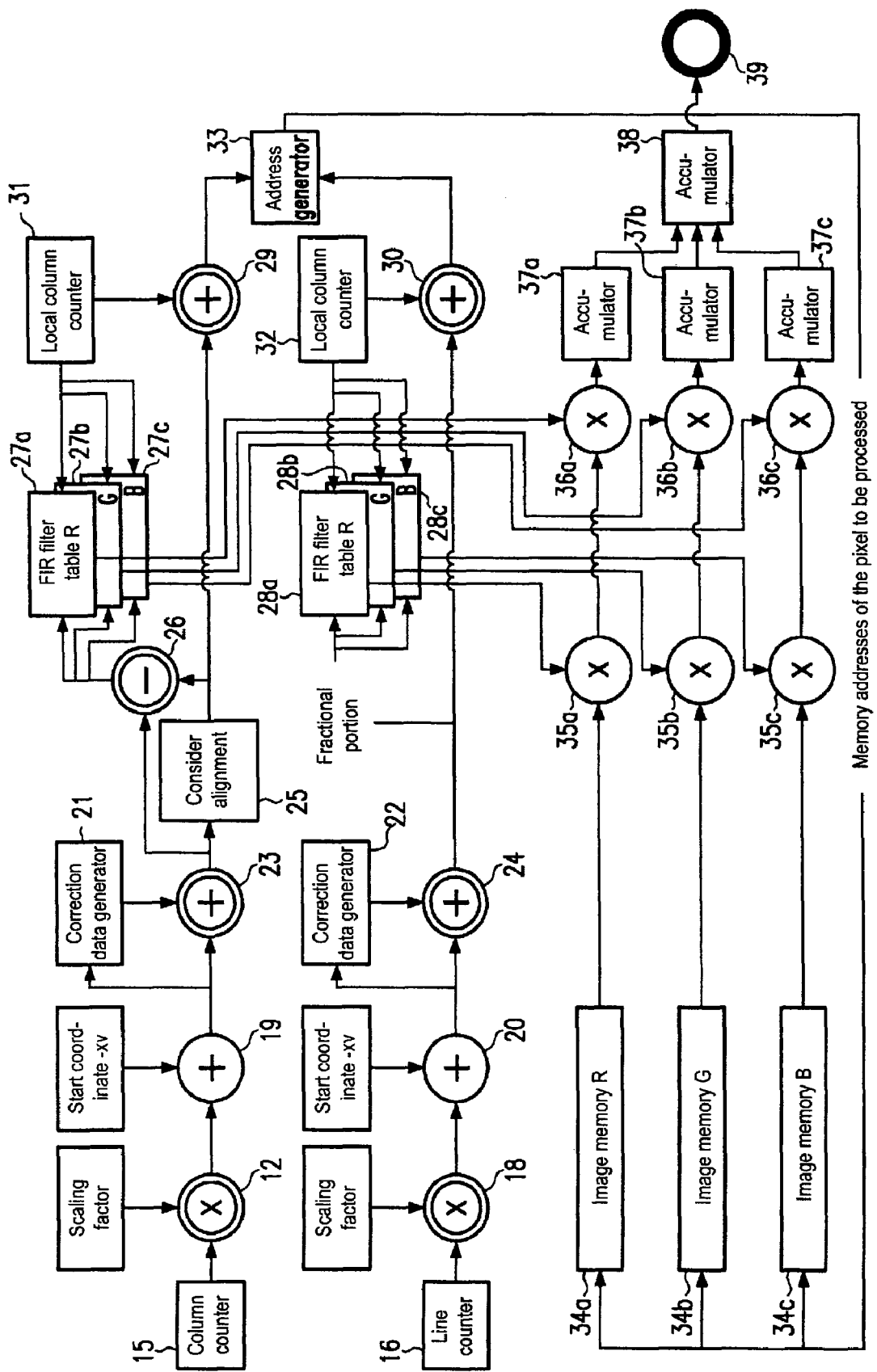
FIG. 4 is a block diagram of an evaluation device for execution of the method according to the preferred embodiment.

A device to execute the method according to the preferred embodiment is schematically presented in FIG. 4. This device possesses a column counter 15 and a line counter 16. The column counter 15 counts the columns in the target image. The line counter 16 counts the lines in the target image. When the column counter 15 has counted through all columns in the target image once, the line counter increments by one line. The pixels of the target image are thus successively enumerated line-by-line. These two counters 15, 16 provide at which pixel in the target image the mapping from the source image should be executed.

A multiplier 17, 18 with which the column count or the line count is multiplied with a corresponding scaling factor is respectively downstream from the column counter 15 and the line counter 16. The scaling factor represents the increment in the source image, such that the separation of two pixels in the target image (i.e. the distance between two adjacent columns or lines) are mapped to the source image in the unit of the separation of two adjacent pixels in the source image.

Adders 19, 20 that respectively add a start coordinate to the respective column or line count are respectively downstream from the multipliers 17, 18. On the one hand, the image section in the source image that should be mapped to the target image is mapped given this start coordinate. On the other hand, the start coordinate centers FIR filters around the respective pixel in the source image, which is explained in detail below. The column and line counts so corrected are respectively supplied to a correction data generator 21, 22 and an adder 23, 24. The correction data generators 21, 22 calculate a correction value from the supplied column and line count using a predetermined function or a look-up table, which correction value corrects (for example) a registration error that is caused by use of a specific optic in the generation of the source image. This correction value is supplied to the respective adder 23, 24 and is added with the corresponding column or-line count. The column and line count so obtained indicate the coordinate in the source image as of which the FIR filter (explained above) for calculation of the pixel of the target image can calculate with the column and line count provided by the column counter 15 and line counter 16.

An element for alignment correction 25 and, in a branch, a subtractor 26 follows the adder 23. The element for alignment correction 25 and the subtractor 26 are initially not considered in the explanation of the device according to the preferred embodiment. The fractional portion of the column count is supplied to the FIR filter sub-tables 27a, 27b, 27c via this branch, which leads to the FIR filter sub-tables 27a, 27b, 27c.

In a corresponding manner, the FIR filter sub-tables 28a, 28b, 28c to which the fractional part of the line count is supplied are arranged after the adder 24. The integer portions of the column count or the line count are supplied to an adder 29 or 30. A local column counter 31 or a local line counter 32 is respectively interconnected between the adders 29, 30 and the FIR filter sub-tables 27a, 27b, 27c, 28a, 28b, 28c. Upon application of a specific column or line count at the adders 29, 30, the local column counter 31 and the local line counter 32 respectively count from 0 to n-1, wherein n is the number of the filter coefficients. The counter count i of the local column counter 15 is relayed to the FIR filter sub-tables 27a, 27b, 27c and according to this (i-th filter value) the corresponding filter value is selected from the filters corresponding to the second fractional portion, i.e. the FIR sub-filter is selected using the fractional portion (corresponds to the interpolation shift) and then the filter coefficient is read out from the respective FIR sub-filter. A filter value is hereby read out from the three FIR sub-filters 27a, 27b, 27c.

In a corresponding manner, in the FIR sub-filter tables 18a, 18b, 18c the filter values are selected dependent on the fractional portion and the counter value of the local line counter 32. The counter value of the local column counter 31 is added to the integer column count at the adder 29, whereby the column count is calculated corresponding to the corresponding filter value. In a corresponding manner, the counter value of the local line counter 32 is added to the integer line count supplied to the adder 30. An output value of the adder 29 (column count) and an output value of the adder 30 (line count) respectively form a coordinate pair that is supplied to an address generator 33. In the address generator 33 these coordinates are converted into corresponding address data that specify the address in image memories 20a, 20b, 20c. The image memories 20a, 20b, 20c contain the color separations of the source image. and the addresses generated by the address generator 33 designate the data of the color separations in the image memories 20a, 20b, 20c in the image memories 20a, 20b, 20c, which data of the color separations correspond to the coordinate pairs supplied to the address generator 33. The corresponding values are then read out from the image memories 34a, 34b, 34c, initially multiplied with the filter values from the FIR sub-filter tables 28a, 28b, 28c at first multipliers 35a, 35b, 35c and then with the filter values from the FIR sub-filter tables 27a, 27b, 27c at second multipliers 36a, 36b, 36c. The local column counter 31 for each step is run through once in the local line counter 32 to calculate a pixel, meaning that after each pass of the local column counter 31 the local line counter 32 is incremented by one. The values hereby determined are added up into partial values in sub-accumulators 37a, 37b, 37c and the totaled values then are supplied to an accumulator 38 with which the three partial values are added up. The total value represents the grey value of the pixel in the target image that is defined by the column count provided by the column counter 15 and the line count provided by the line counter 16.

After output (output 39) of the corresponding grey value, the column counter 17 is increased by one and a new grey value is calculated, wherein the local column counter 31 and the local line counter 32 again run through their respective value range once.

If the column counter arrives at the last column, it is again set to 0 and begins at the first column, and the line counter is incremented by one. If both the column counter and the line counter arrive at their maximum values, the complete target image is calculated.

Since FIR filters can be separated, the filter calculations according to the preferred embodiment can be executed simultaneously both in the column direction and in the line direction and are superimposed via successive multiplication at the first and second multipliers 35a, 35b, 35c, 36a, 36b, 36c.

The property of computers that they normally operate with data words comprising 32 bits although only 8 bits are required to describe a pixel can be utilized with the element 25 (explained above) for alignment correction. The values of four pixels can thus be retrieved with one access with the reading of one data word. The element for alignment correction takes this into account and sets the column count such that the next smallest address divisible by 4 is present at the address generator 33. This truncation has the effect of a shift to the left.

This shift could be reversed by a corresponding multiplexer that compensates for this shift again. However, it is more elegant to process this integer shift together with the sub-pixel shift in the filter and to compensate with the FIR sub-filter tables present anyway. For this the differentiator 26 generates the difference between the column count present at the address generator 33 and the column count output by the adder 23. The difference then yields the sum of an integer shift and the sub-pixel shift formed by the fractional portion. Not only the sub-pixel shift but also the shift by multiple pixels corresponding to the truncation of the memory access address is thus also executed with the filter.

The device described above using FIG. 4 is a hardware circuit to map a source image to a target image. This hardware circuit is designed from simple, standard components, which is why it can be cost-effectively produced. It additionally allows a very fast mapping of the source image to the target image.

The preferred embodiment can naturally also be realized via a data processing program that is executed on a corresponding microprocessor.

The method according to the preferred embodiment is provided for application in a scanner, in particular a high-capacity scanner, with which the scanning speed can be increased from 800 sheets DIN A4 per minute to 2400 sheets DIN A4 per minute, wherein each sheet is scanned, interpolated and corrected with a corresponding transfer function.

The principle according to the preferred embodiment can also be used in other application fields (such as, for example, in digital photo apparatuses) for generation of black-and-white images.

The present preferred embodiment represents a further development of the preferred embodiment from PCT EP2005/12882. The entire content of PCT EP2005/12882 is therefore referenced and it is incorporated into the present patent application.

The preferred embodiment has been described above using an example in which three color separations that are then mapped to a black-and-white image are generated by means of three line arrays that are respectively designed to detect a different color.

The preferred embodiment can be briefly summarized as follows:

The preferred embodiment concerns a method and a device for scanning images, wherein a source image is registered by means of a color sensor. The color sensor possesses multiple line arrays that are respectively designed to detect a specific color. Color separations are generated with these line arrays. According to the preferred embodiment, separate FIR sub-filters are applied to the color separations without the color separations having to be mixed into a complete color image beforehand. The mixing of the pixels automatically occurs upon filtering.

It is hereby possible that the multiple line arrays simultaneously scan pixels of the source image, and these pixels can be mapped in real time to pixels of a target image.

Although preferred exemplary embodiments have been shown and described in detail in the drawings and in the preceding specification, they should be viewed as merely examples and not as limiting the invention. It is noted that only the preferred exemplary embodiments are presented and described, and all variations and modifications that presently and in the future lie within the protective scope of the invention should be protected.

I claim as my invention:

1. A method for scanning an image, comprising the steps of:
    scanning a specific source image with a sensor that comprises multiple line arrays that are respectively designed to detect a specific color such that one color separation of a source image to be scanned is generated by each line array, said color separations depicting the source image in the form of pixels, wherein the pixels of the different color separations of said specific source image are offset somewhat relative to one another;
    separately filtering the pixels of the color separations of the source image with multiple FIR sub-filters, and summing the filtered pixels of the multiple color separations of the source image into pixels of a target image, wherein a black-and-white image is generated said target image; and
    executing upon the filtering an interpolation of the pixels of the color separations of the source image to form the pixels of the target image.

2. A method according to claim 1 wherein a correction of the scanned source image is executed upon the filtering.

3. A method for scanning an image, comprising the steps of:
    scanning a specific source image with a sensor that comprises multiple line arrays that are respectively designed to detect a specific color such that one color separation of a source image to be scanned is generated by each line array, said color separations depicting the source image in the form of pixels, wherein the pixels of the different color separations of said specific source image are offset somewhat relative to one another;
    separately filtering the pixels of the color separations of the source image with multiple FIR sub-filters, and summing the filtered pixels of the multiple color separations of the source image into pixels of a target image, wherein a black-and-white image is generated as said target image; and
    offsetting the pixels of the color separations of the specific source image relative to one another by a specific interval that corresponds to a distance between two adjacent pixels in the color separation divided by the number of color separations.

4. A method for scanning an image, comprising the steps of:
    scanning a specific source image with a sensor that comprises multiple line arrays that are respectively designed to detect a specific color such that one color separation of a source image to be scanned is generated by each line array, said color separations depicting the source image in the form of pixels, wherein the pixels of the different color separations of said specific source image are offset somewhat relative to one another;
    separately filtering the pixels of the color separations of the source image with multiple FIR sub-filters, and summing the filtered pixels of the multiple color separations of the source image into pixels of a target image, wherein a black-and-white image is generated as said target image; and
    generating three color separations in the colors red, green and blue.

5. A method for scanning an image, comprising the steps of:
    scanning a specific source image with a sensor that comprises multiple line arrays that are respectively designed to detect a specific color such that one color separation of a source image to be scanned is generated by each line array, said color separations depicting the source image in the form of pixels, wherein the pixels of the different color separations of said specific source image are offset somewhat relative to one another;
    separately filtering the pixels of the color separations of the source image with multiple FIR sub-filters, and summing the filtered pixels of the multiple color separations of the source image into pixels of a target image, wherein a black-and-white image is generated as said target image; and
    generating the FIR sub-filters with the following steps:
    scalar products of a vector product of a vector of a predetermined FIR filter are generated with a vector comprising the corresponding pixels of the color separations of the source image, wherein the scalar products are generated for every application of the FIR filter to predetermined interpolation shifts;
    the scalar products are respectively considered for a complete sequence of pixels of the color separations of the source image that comprises multiple complete sets of pixels, wherein a set of pixels respectively has exactly one pixel of the different colors;
    the pixels that are not multiplied with any coefficient of a filter are multiplied with 0; and
    the sub-filters comprise as coefficients factors of the scalar products of the vector product that are multiplied with a respective pixel of a specific color, and said factors are adopted into the sub-filter in a same arrangement as in the vector product.

6. A device for scanning an image, comprising:
    a sensor that comprises multiple line arrays for scanning a specific source image that are respectively designed to detect a specific color, such that one color separation of the source image to be scanned is generated by each line array, said color separations depicting the source image in the form of pixels, wherein the pixels of the color separations of the specific source image are offset somewhat relative to one another;

a control unit that is designed to respectively apply a FIR sub-filter to the color separations in order to map the pixels of the multiple color separations to a specific target image, wherein a black-and-white image is generated as a target image; and the control unit is designed to execute a method comprising the steps of:

scanning the specific source image with the sensor so that said one color separation of said source image is generated by each line array; and separately filtering the pixels of the color separations of a source image with said multiple FIR sub-filters, and summing the filtered pixels of the multiple color separations of the source image into pixels of said target image, wherein said black-and-white image is generated as said target image.

7. A device according to claim 6 wherein the control unit has a microprocessor and a storage medium in which is stored a data processing program for execution of said method steps by said microprocessor.

8. A device for scanning an image, comprising:

a sensor that comprises multiple line arrays for scanning a specific source image that are respectively designed to detect a specific color, such that one color separation of the source image to be scanned is generated by each line array, said color separations depicting the source image in the form of pixels, wherein the pixels of the color separations of the specific source image are offset somewhat relative to one another;

a control unit that is designed to respectively apply a FIR sub-filter to the color separations in order to map the pixels of the multiple color separations to a specific target image, wherein a black-and-white image is generated as a target image; and designing the control unit as a hardware circuit comprising:

a column counter downstream of which is a multiplier for multiplication of a column count with a scaling factor;

a line counter downstream of which is a multiplier for multiplication of a line count with a scaling factor;

a correction means for receiving and correcting the multiplied column count and the multiplied line count;

FIR sub-filter tables associated with the column count;

FIG sub-filter tables associated with the line count;

a local column using a value of which the corresponding filter coefficients are read out from the FIR sub-filter tables, and said value being added to the column count by means of an adder;

a local column counter using a value of which the filter coefficients of the FIR filter table are read out, and said value being added to the line count by means of an adder;

an address generator that, using a corrected column/line count supplemented by the local column counter or local line counter, generates an address for an image memory in which the color separations of the source image are stored;

two sets of multipliers that multiply values of the pixels of the color separations with the filter coefficients; and accumulators that add up all image values multiplied with the filter coefficients for one pass of the local column counter for every value of the local column counter.

9. A device for scanning an image, comprising:

a sensor that comprises multiple line arrays for scanning a specific source image that are respectively designed to detect a specific color, such that one color separation of the source image to be scanned is generated by each line array, said color separations depicting the source image in the form of pixels, wherein the pixels of the color separations of the specific source image are offset somewhat relative to one another;

a control unit that is designed to respectively apply a FIR sub-filter to the color separations in order to map the pixels of the multiple color separations to a specific target image, wherein a black-and-white image is generated as a target image; and the device having a microprocessor and a storage medium in which is stored, a data processing program for calculation of the filter coefficients being stored and can be executed by said microprocessor.

* * * * *